M. B. MORGAN.
DRIVING SPROCKET FOR TRACTORS.
APPLICATION FILED SEPT. 15, 1919.
1,357,719.
Patented Nov. 2, 1920.
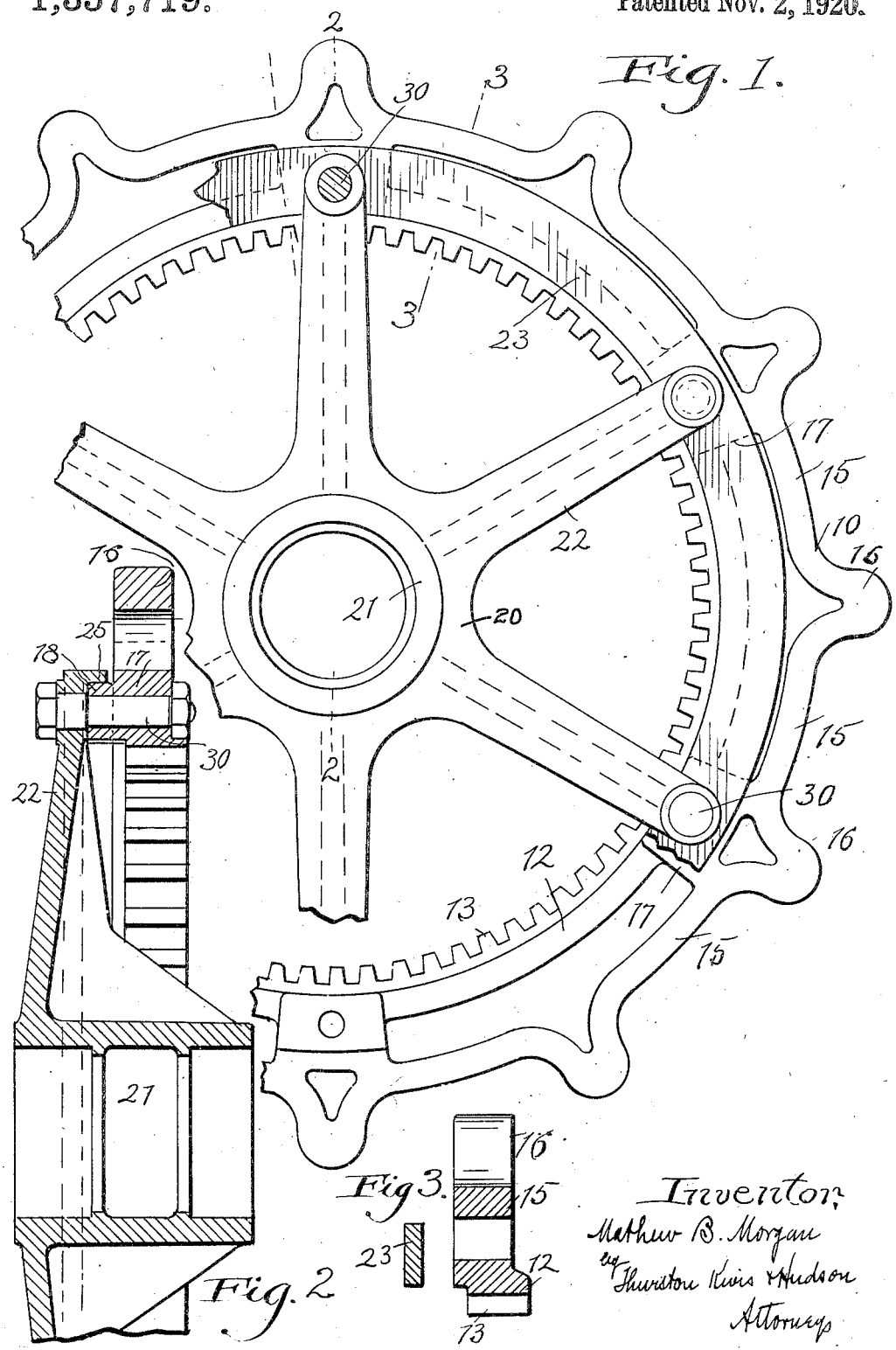

UNITED STATES PATENT OFFICE.

MATHEW B. MORGAN, OF CLEVELAND HEIGHTS, OHIO, ASSIGNOR TO THE CLEVELAND TRACTOR COMPANY, OF EUCLID, OHIO, A CORPORATION OF OHIO.

DRIVING-SPROCKET FOR TRACTORS.

1,357,719.  Specification of Letters Patent.  Patented Nov. 2, 1920.

Application filed September 15, 1919. Serial No. 323,693.

*To all whom it may concern:*

Be it known that I, MATHEW B. MORGAN, a citizen of the United States, residing at Cleveland Heights, in the county of Cuyahoga and State of Ohio, have invented a certain new and useful Improvement in Driving-Sprockets for Tractors, of which the following is a full, clear, and exact description.

This invention is particularly designed for use in connection with the kind of track laying tractors which are typified in White Patent No. 1,253,319, in which each of the track belts runs over and is driven by a driving sprocket which is provided with an internal ring gear with which a driven pinion engages to turn said sprocket.

The invention relates entirely to the construction of this driving sprocket, the object being to produce a driving sprocket of the sort specified, which will serve the intended purpose for a long time, notwithstanding the fact that the ring gear thereof as well as the sprocket which engages it are not incased, but are so exposed that grit and dirt and dust may freely lodge in the teeth of the ring gear or pinion.

Much time, effort and money have been expended in the effort to so incase the ring gear and driving pinion of such a tractor that dirt and grit could not get between the teeth,—and some such expedient was necessary with the old construction, because with ordinary steel gears if dirt and grit did get between the teeth, they would very soon become so worn that they would be practically useless.

The present invention rejects all attempts to incase the gears, and aims to secure practical results by providing said driving sprocket with a rim made of manganese steel or other equivalent material which dirt and grit can not seriously injure, and to cast this rim with integral substantially perfect internal gear teeth as well as with integral external sprocket teeth.

The invention consists in the construction and combination of parts shown in the drawing and hereinafter described and pointed out definitely in the appended claims.

In the drawing, Figure 1 is a side view of part of a wheel from the left side of Fig. 2, a part of the ring 23 being broken away; Fig. 2 is a radial sectional view on line 2—2 of Fig. 1; and Fig. 3 is a radial section through the rim of the wheel in the plane indicated by line 3—3 on Fig. 1.

Referring to the parts by reference characters, 10 represents the wheel rim; and 20 represents the wheel body. These two parts, having the characteristics of construction which are shown in the drawing and will be presently explained, constitute, when connected together, the driving sprocket wheel.

The wheel body is a casting, preferably an ordinary steel or malleable casting, which comprises a hub 21, a plurality of spokes 22 which radiate therefrom, and a flat ring 23 which is integrally connected with the outer ends of these spokes.

The rim 10 is also a casting, but the material is manganese steel or some equivalent material. This material is so hard that it is practically impossible to machine finish it. Therefore it has to be cast substantially perfect and ready for attachment to the wheel body and ready for use as a part of the wheel when so attached.

This rim is formed of two concentric rings of different diameter, one within the other. The inner ring 12 has internal gear teeth 13 on its inner periphery. The outer ring 15 is formed with a plurality of sprocket teeth 16,—which sprocket teeth are hollow and the walls thereof have substantially the same thickness as the wall of the outer ring between the sprocket teeth. The outer ring 15 and the inner ring 12 are held spaced apart but are connected at regular intervals by integral braces 17 which extend from the inner ring to the outer ring, and are located in radial alinement with alternate sprocket teeth 16 thereon. These braces 17 project out of the plane of the two rings as bosses 18. These bosses and braces are formed with transverse holes through them for the passage of bolts 30 which likewise pass through holes in the rim 23 of the wheel body, which holes are in radial alinement with the several spokes. The rim or ring 23 adjacent the bosses 18 is formed with overhanging flanges 25 which engage the outer peripheries of these bosses. The rim, comprising as stated, the inner gear ring 12 and the outer sprocket ring 15, having hollow sprocket teeth together with the braces connecting these two rings in radial alinement with alternate sprocket teeth, is a construction which can be cast, and which when cold will have a practically perfect gear ring. This is because the contraction and distortion incident to the cooling and hardening of the casting will be all absorbed or taken care of by the outer sprocket ring. The result will be that the outer sprocket ring may not be as perfect as could be wished, but it is nevertheless perfect enough for practical purposes.

The construction also has certain advantages in use, namely, the sprocket ring has a desirable degree of resiliency and flexibility which absorbs much of the strain and shock imposed upon it by the sprocket chain in use, especially when the tractor is going over rough and uneven ground, which would otherwise be injuriously transmitted to the wheel bearing.

Having described my invention, I claim:

1. In a track laying tractor, a driving sprocket wheel composed of two separately formed but connected parts, to wit, a wheel body having integral hub and spokes, and a rim comprising an inner cylindrical ring having internal gear teeth, and a concentric outer cylindrical ring having a plurality of hollow sprocket teeth,—which outer ring is spaced away from but is connected to the inner ring by integral braces, and bolts which pass through said braces and connect them to the outer ends of the spokes of the wheel body.

2. In a track laying tractor, a driving sprocket wheel composed of two separately formed but connected parts, to wit, a wheel body having integral hub and spokes, and a rim comprising an inner cylindrical ring having internal gear teeth, and a concentric outer cylindrical ring having a plurality of hollow sprocket teeth,—which outer ring is spaced away from but is connected to the inner ring by integral braces which are located in radial alinement with alternate sprocket teeth, and bolts which pass through said braces and connect them to the outer ends of the spokes of the wheel body.

3. In a track laying tractor, a driving sprocket wheel composed of two separately formed but connected parts, to wit, a wheel body comprising a hub, integral spokes and an integral flat ring which connects said spokes near their ends, and a rim made of manganese steel comprising an inner cylindrical ring having internal gear teeth and an outer ring formed with outwardly projecting hollow sprocket teeth, said outer ring being spaced away from the inner ring and being connected thereto by a plurality of integral braces located in radial alinement with alternate sprocket teeth, and bolts connecting said wheel body and rim together,—which bolts pass through holes in said braces and pass also through holes in the wheel body ring adjacent the ends of the spokes thereof.

In testimony whereof I hereunto affix my signature.

MATHEW B. MORGAN.